United States Patent [19]
Osder

[11] 3,857,535
[45] Dec. 31, 1974

[54] MONITOR FOR THE ELASTIC MODE STABILIZING CHANNELS OF AN AUTOMATIC FLIGHT CONTROL SYSTEM

[75] Inventor: Stephen S. Osder, Scottsdale, Ariz.
[73] Assignee: Sperry Rand Corporation, Great Neck, N.Y.
[22] Filed: Sept. 22, 1972
[21] Appl. No.: 291,441

[52] U.S. Cl. .............................. 244/77 M, 318/565
[51] Int. Cl. ............................................ B64c 13/18
[58] Field of Search ......... 235/150.1; 244/3.1, 3.21, 244/76 C, 77 G, 77 M; 318/563–565; 328/146; 340/409

[56] References Cited
UNITED STATES PATENTS

| | | | |
|---|---|---|---|
| 3,051,416 | 8/1962 | Rotier | 244/77 M |
| 3,079,108 | 2/1963 | Falkner et al. | 244/77 M |
| 3,221,229 | 11/1965 | Kezer et al. | 244/77 M X |
| 3,240,447 | 3/1966 | Olshausen | 244/77 G |
| 3,279,725 | 10/1966 | Andrew et al. | 244/77 G |
| 3,403,874 | 10/1968 | Boskovich et al. | 244/77 M |
| 3,412,961 | 11/1968 | Howard | 244/77 G |
| 3,665,217 | 5/1972 | Adams et al. | 244/77 M X |

FOREIGN PATENTS OR APPLICATIONS
126,623  5/1959  U.S.S.R. ........................... 244/77 M

Primary Examiner—Trygve M. Blix
Assistant Examiner—Stephen G. Kunin
Attorney, Agent, or Firm—Howard P. Terry; Albert B. Cooper

[57] ABSTRACT

Automatic flight control systems for flexible craft often include an elastic mode stabilizing channel that provides signals to craft control surfaces so as to reduce craft bending motions. The invention comprises a sensing system for effectively detecting the characteristics of the control activity applied by the elastic mode stabilizing channel and determining whether that control activity is achieving the desired elastic mode stabilization. When a signal generated by this sensing system exceeds a specified threshold level, it is indicative of a failure within the elastic mode stabilization channel and the logic obtained thereby is used to disable the elastic mode stabilization channel. A turbulence sensor is included for providing a signal to adjust the threshold in accordance with the level of turbulence experienced by the craft.

11 Claims, 3 Drawing Figures

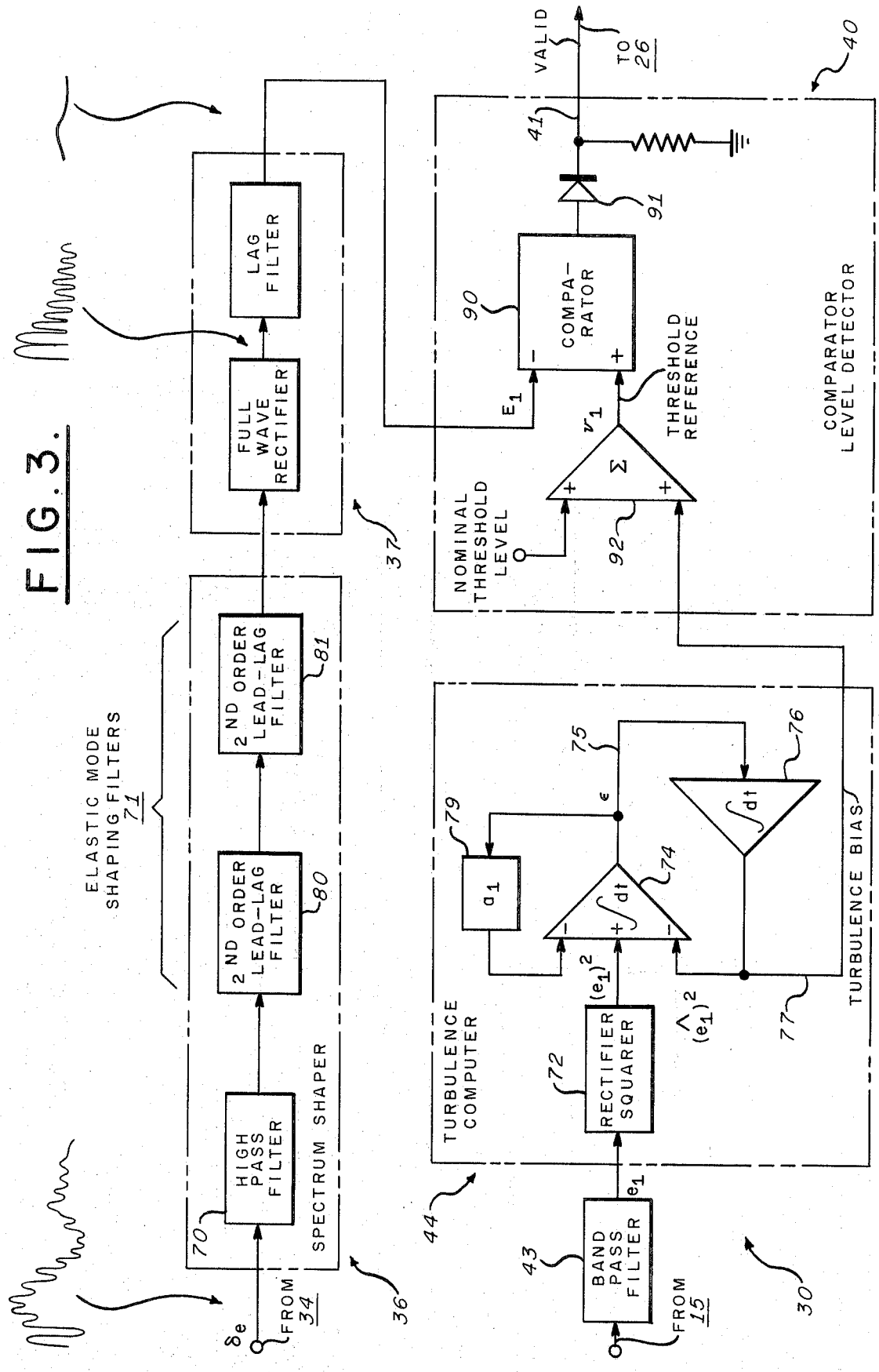

MONITOR FOR THE ELASTIC MODE STABILIZING CHANNELS OF AN AUTOMATIC FLIGHT CONTROL SYSTEM

BACKGROUND OF THE INVENTION

1. Field of the Invention

The invention pertains to automatic flight control systems for aeroelastic navigable craft particularly with regard to monitoring the elastic mode stabilizing channels thereof.

2. Description of the Prior Art

It is often a requirement of present day automatic flight control systems, particularly of the type for use in modern jet transports, that should a failure occur, the system would remain operative. This desideratum is normally achieved by utilizing triply or quadruply redundant control channels with signal comparison monitoring and signal voting circuits therebetween. When a failure occurs in one channel, the redundant channels permit continued operation of the system hence permitting completion of flight and enhancing the safety of the aircraft.

Such systems for use in aeroelastic craft often include elastic mode stabilizing channels for providing signals to the control surface actuators to damp the bending motions of the craft. Thus, it is appreciated that such systems and control surface actuators should have adequate bandwidth to phase stabilize the elastic modes of the vehicle. If it should be desired to include the elastic mode channel monitoring function within the bandwidth of the cross-channel comparison monitors of such systems, the thresholds of the monitors are necessarily narrowly set so as to detect the high frequency failures that may occur in the elastic mode channels. Such narrow thresholds would tend to render the monitors prone to nuisance failure indications. Additionally, since the elastic and rigid body control channels would be commonly monitored, fast, precise comparators and complex switching logic circuits would be required in these prior art systems. Should the comparison monitors include low pass filters to remove the high frequency elastic mode signals, these filters would prevent the detection of failures in the high frequency elastic mode stabilization channels.

Additionally, in order to prevent nuisance disengagements, such systems normally include time delay circuits following the commparison monitor circuits such that only a failure that persists for the entire time delay interval would indicate a failure. Such a time delay circuit normally resets instantaneously when the error producing signal applied to the monitor falls below the threshold level thereof. A subsequent failure signal from the monitor would then experience the full time delay interval before a failure would be indicated. For an oscillatory failure whose period of oscillation is less than twice the time delay interval of the monitor, failure would not be indicated since the monitor is reset every half cycle of the oscillatory failure signal. Such oscillatory failures are of the type that would normally occur in the elastic mode channels. In order to detect such oscillatory failures, the time delay interval of the monitor would necessarily be limited, or alternatively, a reset time constant might be introduced into the time delay circuit. In either event, the margin with respect to nuisance failure indications would be compromised particularly during flight through turbulent air.

For the foregoing reasons, it is believed in prior art automatic flight control systems utilizing bending mode stabilization, that the elastic mode channels have heretofore not been successfully monitored for failure. It is believed that the cross-channel comparison monitors have included filters for removing the elastic mode frequencies as hereinabove described.

SUMMARY OF THE INVENTION

The automatic flight control systems hereinabove discussed are rendered fail operative by utilizing redundant rigid body control channels with cross-channel comparison monitors and voting circuits. When a failure occurs in one rigid body control channel, another channel is utilized to sustain operation of the system. In accordance with the concepts of the present invention, it is considered that the elastic mode control channels are not critical for vehicle handling qualities or stability as are the rigid body control channels. Hence, it is not required that the elastic mode damping channels be operative to ensure safety of flight. The primary purposes of the body bending damping channels are structural fatigue alleviation and crew and passenger comfort. However, failures that may commonly occur in the elastic mode channels may result in catastrophic effects such as aircraft structural fatigue failure or loss of control stability. Failures such as component malfunctions or excessive tolerance shifts in the dynamics of the gyros, computing circuits or servo actuators may cause a phase reversal resulting in a regenerative instability in the elastic mode channels. This type of failure causes the elastic mode channels to operate the control surfaces such that the aircraft is vibrated at an elastic mode frequency through large excursions instead of damping these motions as is accomplished during normal operation. Thus, if failures should occur in the elastic mode channels such that the phasing of the control activity deteriorates, these channels cause the aircraft elastic modes to diverge by adding energy or excitation to these modes.

Thus, in accordance with the invention, a sensor is included for effectively detecting the level of control activity applied by the elastic mode stabilizing channels to the control surfaces. A detector provides a disabling signal in accordance with the signal from the control activity sensor exceeding a threshold. When the signal from the sensor exceeds a threshold, the elastic mode loop is disabled. A further sensor may be included for detecting the level of turbulence experienced by the craft and adjusting the detector threshold in accordance therewith.

Thus, it is appreciated that the cross-channel monitors associated with the rigid body stabilization channels may utilize thresholds that are commensurate with rigid body failures thus reducing the occurrence of nuisance disengagements. The elastic mode channels are separately monitored in accordance with the invention to disable the elastic mode function in accordance with the control activity applied to the control surfaces by the elastic mode channels.

BRIEF DESCRIPTION OF THE DRAWINGS

FIG. 3 is a schematic block diagram of the elastic mode monitor of FIG. 1.

DESCRIPTION OF THE PREFERRED EMBODIMENT

Figure 1:
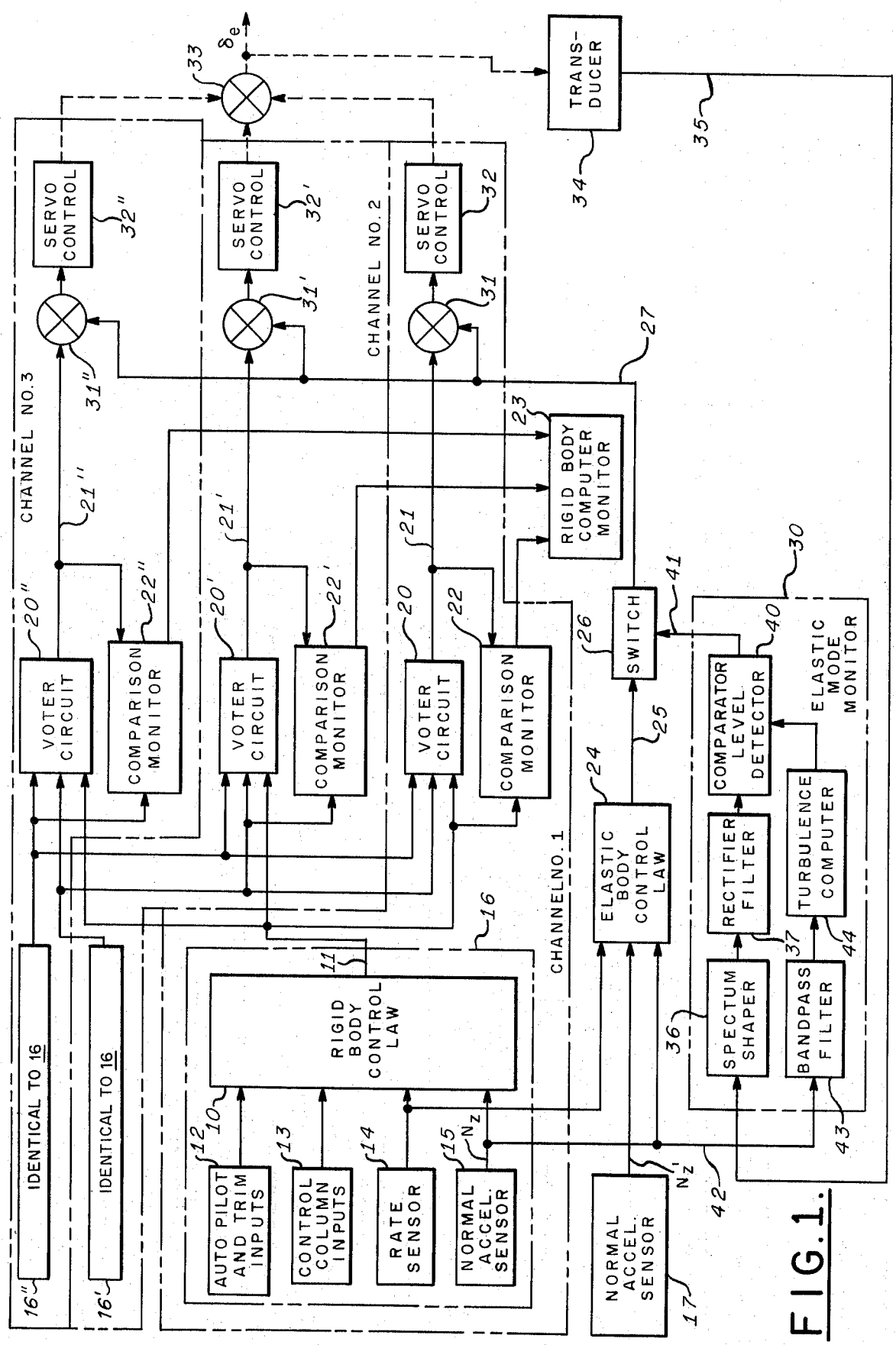
FIG. 1 is a schematic block diagram of a portion of an automatic flight control system instrumented in accordance with the invention.

Referring to FIG. 1, a portion of an automatic flight control system incorporating the invention is illustrated. The system illustrated is of the multiply redundant fail-operative configuration well known in the present day automatic flight control industry particularly for use in modern jet transports. A triply redundant portion of the pitch channels of such a system is depicted for purposes of explanation of the invention. The portion of the automatic flight control system illustrated comprises identical pitch channels 1, 2 and 3.

The pitch channel 1 includes rigid body control law circuits 10 which receives as inputs the variety of command and stabilization signals utilized in the automatic control of the aircraft. The rigid body control law circuits 10 provide, in a well known manner, signals on a lead 11 suitable for controlling the servomechanism of the pitch attitude control surfaces of the aircraft. It is appreciated that in the present configuration, the rigid body control law circuits 10 include low pass filter circuits having a sharp roll-off at high frequencies such that the signals applied to the lead 11 by the rigid body control law circuits 10 contain only frequencies pertinent to the rigid body control and stabilization of the craft. Signals at the higher elastic mode frequencies of the aircraft are processed in a separate control and stabilization loop in a manner to be discussed. The rigid body control law circuits 10 may be instrumented by a wide variety of well known arrangements in accordance with the rigid body dynamics of the craft for which the system is designed. Such a control law may be of the type generally discussed in U.S. Pat. application Ser. No. 103,554 filed Jan. 4, 1971 entitled "Augmented Washout Circuit For Use in Automatic Pilots" by the present inventor and assigned to the same assignee as the present invention and now U.S. Pat. No. 3,752,420 issued August 14, 1973.

As previously described, the rigid body control law circuits 10 normally receive, as inputs, a variety of command and stabilization signals from the controls and sensors of the craft. Apparatus represented by a block 12 may, for example, provide autopilot and trim inputs from attitude and air data sensors to provide rigid body stabilization during the various flight regimes of the craft. For example, the block 12 may provide altitude or attitude hold signals during the cruise regime of the craft or may provide other path control signals such as glide slope acquisition and holding signals during an automatic landing mode of the system.

In systems having control wheel steering or command augmentation capabilities, a block 13 representing such apparatus may be utilized to provide pilot command signals from control column transducers in a conventional manner.

A pitch rate sensor 14 is also included to provide pitch rate stabilization signals to the rigid body control law circuits 10 of the pitch channel 1 of the system. The rate sensor 14 may be instrumented by one or more pitch rate gyros located in the aircraft to sense both the rigid body and elastic mode motions of the craft generally in the manner discussed in said U.S. Pat. No. 3,752,420. The pitch rate rigid body signals are, of course, processed by the circuits 10 to provide rigid body stabilization about the pitch axis of the craft and the elastic mode signals from the sensor 14 are filtered by the circuits 10 and hence prevented from propagating to the lead 11.

The rigid body control law instrumented by the circuits 10 utilizes the normal acceleration of the craft in providing stabilization thereof. A normal acceleration signal is provided to the circuits 10 by a normal acceleration sensor 15. The normal acceleration sensor 15 may be instrumented by an accelerometer mounted near the center of gravity of the aircraft for sensing primarily rigid body accelerations thereof directed along the craft's Z axis. The accelerometer 15 is preferably mounted near the center of gravity of the craft to minimize the sensing of craft bending or elastic mode accelerations for reasons to be discussed.

The blocks 10, 12, 13, 14 and 15 of channel 1 may be considered as comprising a block 16. Identical blocks 16' and 16'' are included in channels 2 and 3, respectively, to contribute to the fail-operative capabilities of the system for reasons well appreciated in the art.

The output of the block 16 in channel 1 is connected as an input to a voter circuit 20. Identical voter circuits 20' and 20'' are included in the channels 2 and 3, respectively, and also receive respective inputs from the block 16 of channel 1. the voter circuits 20, 20' and 20'' each have three inputs that receive their remaining two input signals from the blocks 16' and 16'' respectively. When all of the components of the blocks 16, 16' and 16'' are operating properly, the three input signals to each of the voter circuits 20, 20' and 20'' are approximately the same and are therefore proper control signals for the control surface servomechanisms. The voter circuits therefore provide on their respective outputs 21, 21' and 21'' these proper control signals in accordance with their inputs. Each of the circuits 20, 20' and 20'' generally provides on its respective output a signal equal to the input thereof that has a mid value between the remaining two inputs. Such mid value logic circuits or voting circuits are well known in the art and will not be described here in greater detail for brevity. As is well known, should a failure occur in either block 16, 16' or 16'' causing the associated input to each of the voter circuits 20, 20' and 20'' to be significantly different from the remaining two inputs, the voter circuits will provide, at their respective outputs, signals in accordance with the majority of the proper signals. Therefore, although one input to each of the voter circuits 20, 20' and 20'' may be in error because of an upstream failure, the respective outputs 21, 21' and 21'' of the voter circuits will still provide proper control signals for the system.

The pitch channels, 1, 2 and 3 include comparison monitors 22, 22' and 22'', respectively. The inputs of the comparison monitor 22 are connected to receive the output of the block 16 and the output 21 of the voter circuit 20 to provide a signal when its inputs are different from one another within a predetermined tolerance. Similarly, the comparison circuit 22' is connected to provide an output in accordance with a disagreement between the 16' input to the voter circuit 20' and the output from the voter circuit 20' on the lead 21'. In a similar manner, the comparison monitor 22'' compares the 16'' input to the voter circuit 20'' with the voter circuit output on the lead 21''. The comparison monitors 22, 22' and 22'' are conventional circuits of a type well known in the art. It is appreciated that during proper operation of the system, the inputs into each of the comparison monitors 22, 22' and 22'' agree within the predetermined tolerance and, therefore, signals indicative of the proper system operation are provided thereby. If, however, a failure should occur in one of the blocks 16, 16' or 16'', the comparison monitor associated with that block will provide an output signal indicative of the failure.

It will be appreciated that more than three channels may be utilized with more sophisticated voting criteria being instrumented by the voter circuits 20, 20' and 20'' as is well understood in the art. It is further appreciated that since the comparison circuits are utilized to compare only rigid body signals the comparator circuits can include relatively heavy filtering. This filtering permits the detection of static failures (such as hardovers or open circuits) or slow dynamic failures (such as integrator drifts, washout circuit leakages, etc.). High frequency oscillatory failures need not be detected because the rigid body control system's limited bandwidth precludes the occurrence of very high frequency instabilities. This filtering also prevents erroneous or nuisance failure indications that could occur as a result of noise pick-up or brief power supply transients.

The outputs of the comparison monitors 22, 22' and 22'' are applied to a rigid body monitor 23. The rigid body monitor contains conventional logic and switching circuitry for providing an indication of which of the redundant channels has failed and for performing switching actions which improve system safety for any subsequent failures which may occur. It is appreciated that the voter circuits prevent the passage of a failed or erroneous signal but it is often desirable that a failed channel be set to zero. This will ensure that the voter will not transmit a hardover signal for any subsequent failure. The monitor 23 provides this switching capability as well as providing the pilot with system status indication.

The automatic flight control system of FIG. 1 also includes elastic body control law circuits 24 which receive inputs from the rate sensor 14 and the normal acceleration sensor 15 as well as from a normal acceleration sensor 17 located to sense bending accelerations of the aircraft. The elastic body control law circuits 24 provide the elastic mode stabilizing signals for the automatic flight control system on a lead 25. Elastic body control law circuits are generally well known in the art and are designed in accordance with the aeroelastic characteristics of the aircraft in which the system is to be utilized. For example, the elastic body control law circuits 24 may generally be configured in a manner similar to that described in said Ser. No. 103,554.

The elastic mode stabilizing signals on the lead 25 are applied via a switch 26 to a lead 27. Operation of the switch 26 is controlled by an elastic mode monitor 30 in a manner to be described. The elastic mode stabilizing signals on the lead 27 are applied as inputs to summing networks 31, 31' and 31''. The summing networks 31, 31' and 31'' receive as their second inputs the channels 1, 2 and 3 rigid body stabilization signals on the leads 21, 21' and 21'' respectively. Thus, the summing networks 31, 31' and 31'' provide wide bandwidth stabilizing signals for both the rigid body and elastic body control modes of the automatic pilot system.

The outputs of the summing networks 31, 31' and 31'' are applied as inputs to servo controls 32, 32' and 32'', respectively. Each of the servo controls 32, 32' and 32'' comprises a conventional servomechanism of a type well known in the art that provides a mechanical output proportional to the electrical signal applied to its input by the associated summing network.

The three mechanical outputs from the servomechanisms 32, 32' and 32'' are combined in a mechanical summing device 33 whose output provides the $\delta_e$ mechanical signal utilized to position the associated control surface of the aircraft. Since the present invention as embodied in FIG. 1 is described in terms of the pitch channels of the aircraft, the signal $\delta_e$ is utilized to drive the elevators thereof. A conventional transducer 34 is coupled to sense the motion of the control surfaces and provides an electrical signal proportional thereto on a lead 35.

It will be appreciated that the elastic body control law circuits 24, the summing networks 31, 31' and 31'' as well as the servo controls 32, 32' and 32'' have adequate bandwidth to phase stabilize the vehicle elastic modes as well as the rigid body modes. Such devices are well known in the present day automatic pilot technology. Although the elastic body control law circuits 24 are shown as a single channel stabilizing loop, it will be appreciated that a dual elastic body control law loop may be utilized for enhanced reliability.

In accordance with the concepts of the invention, a failure in the elastic mode stabilizing loop of the system may cause a phase reversal that would result in reinforcing elastic mode motions of the craft, precipitating a dangerous de-stabilizing condition or structural fatigue failure of the craft. Such an elastic mode loop failure would result in increased activity of the control surfaces at the elastic mode frequencies of the craft. This increase in control activity is sensed by the transducer 34 that provides its output on the lead 35 to the elastic mode monitor 30. When the control surface activity exceeds a threshold, the elastic mode monitor 30 renders the switch 26 non-conductive thereby disabling the elastic mode stabilizing loop of the system. Since the rigid body control loops remain effective, rigid body stabilization of the craft is sustained in the normal operating manner of the system. Since the elastic mode stabilizing loop is not essential to the safety of the craft, the disabling thereof permits the safe completion of the flight with perhaps an attendant moderate increase in the elastic mode vibration of the craft. This increase in elastic mode motions during a flight in which an elastic mode loop failure may occur, would not significantly degrade the craft resistance to structural fatigue failure.

It will be appreciated that the elastic mode stabilizing loop normally applies an increased level of control activity to the control surfaces during flight through turbulent air as compared to flight through calm air. Therefore, in accordance with another feature of the invention, the threshold of the elastic mode monitor 30 is adjusted in accordance with the turbulence conditions experienced by the craft so as to reduce nuisance disengagements of the elastic mode stabilizing loop.

As previously discussed, a failure condition in the wide bandwidth elastic mode stabilizing loop may add sufficient energy to a craft bending oscillation so that the bending mode becomes divergently unstable. The elastic mode monitor 30 detects such an instability by monitoring the control surface actuator output activity in selected frequency bands by means of, for example, the surface position transducer 34. Accordingly, the output of the transducer 34 is applied to a frequency selective spectrum shaping filter 36. The spectrum shaper 36 provides a set of shaping functions which peak at the critical elastic mode frequencies of the craft. The output of the spectrum shaper 36 is applied to conventional rectifying and filtering circuits 37. The circuits 37 rectify the output of the spectrum shaper 36 and smooth the rectified signal in a low pass network which nominally may have a time constant of 1 to 3 seconds. Thus, the rectifier filter 37 provides the spectrally shaped average value of the control surface activity to a comparator level detector 40. When the signal from the rectifier filter 37 exceeds a threshold for a predetermined time interval the comparator level detector 40 provides a signal on a lead 41. Thus, because of the time constant of the filter 37, whenever the spectrally shaped average value of the control surface activity exceeds the threshold of the comparator level detector 40 for about 1 to 3 seconds, a failure signal is applied to the switch 26 thereby disabling the elastic mode stabilizing channel of the system.

As previously discussed, the threshold of the comparator level detector 40 is adjusted in accordance with the level of turbulence experienced by the aircraft in order to reduce nuisance disengagements. Accordingly, the output of the normal acceleration sensor 15 is applied to the elastic mode monitor 30 via a lead 42. The normal acceleration signal on the lead 42 is applied to a bandpass filter 43 which removes low frequency maneuvering acceleration signals and high frequency body bending and vibration signals. As previously mentioned, the accelerometer 15 is mounted near the center of gravity of the aircraft, thereby minimizing the sensing of bending accelerations. It will be appreciated that the filter 43 has a passband for primarily transmitting frequencies associated with the rigid body motion of the aircraft through turbulent air.

The output of the bandpass filter 43 is applied to a turbulence computer 44 which in turn provides its output to the comparator level detector 40. The turbulence computer 44 provides a signal representative of the approximate root-mean-square (RMS) level of the atmospheric turbulence disturbances experienced by the craft in a manner to be explained. The output of the turbulence computer 44 is utilized to adjust the threshold of the comparator level detector 40 for the reasons previously discussed.

Figure 2:
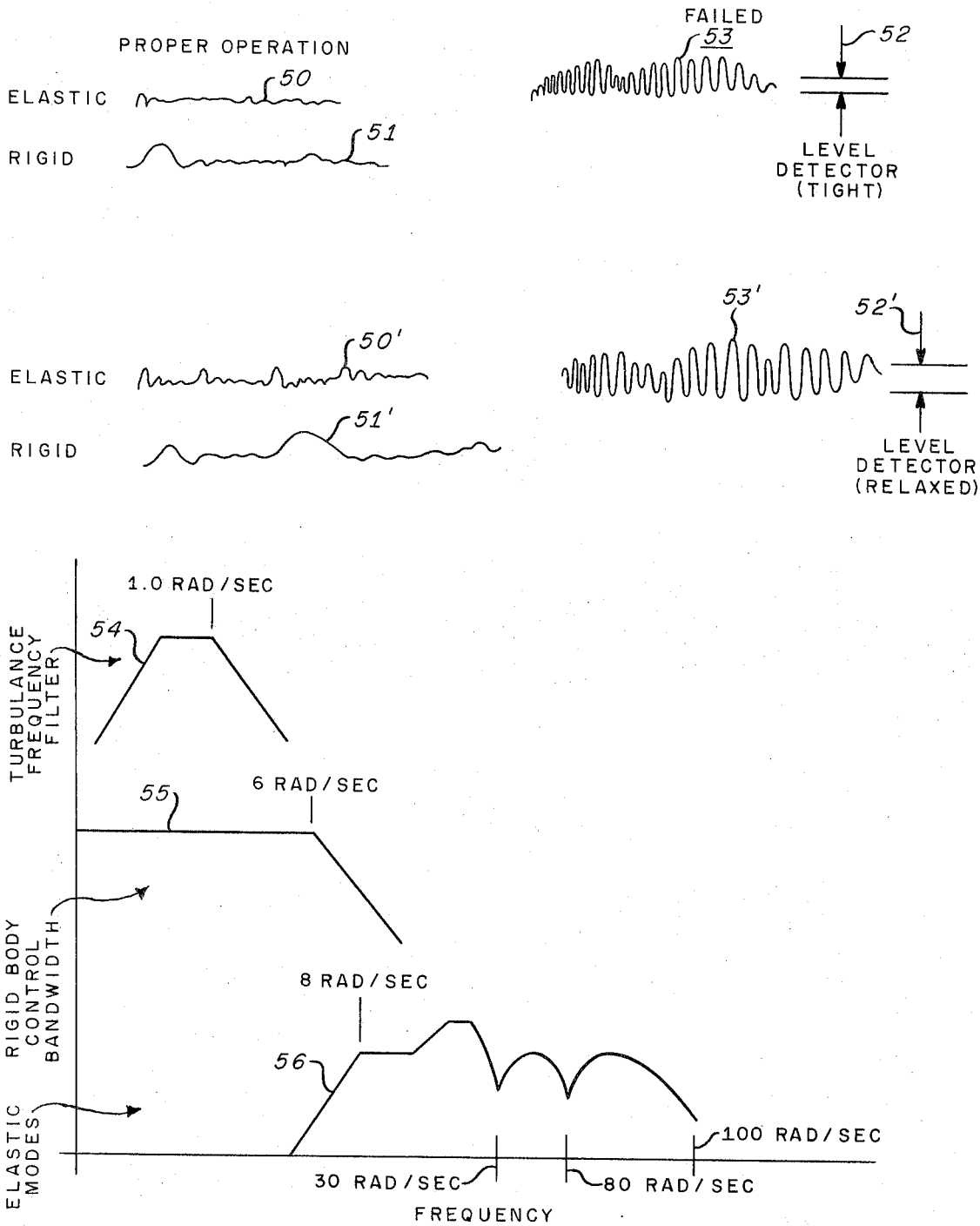
FIG. 2 is a waveform diagram illustrating waveforms useful in explaining the operation of the invention.

A further appreciation of the operation of the invention may be had by reference to FIG. 2 in conjunction with FIG. 1. During flight through calm air when the system is operating properly, the transducer 34 may provide signals which would have elastic body and rigid body components as indicated at 50 and 51, respectively. During flight through calm air, the turbulence computer 44 may establish a tight tolerance for the comparator level detector 40 as indicated at 52. Thus, it is appreciated that the elastic mode signals 50 would not exceed the threshold 52. If, however, a failure should occur that would cause divergence at an elastic mode frequency, the output of the transducer 34 may appear as waveform 53. The waveform 53 exceeds the threshold 52 thus causing the comparator level detector 40 to disable the elastic mode stabilizing loop via the switch 26.

When, however, the craft is flying through turbulent air and the automatic flight control system is operating properly, the elastic mode component of the signals from the transducer 34 may appear as indicated by waveform 50'. Thus it is appreciated that if the threshold of the comparator level detector 40 were maintained as indicated at 52, a nuisance disengagement of the elastic mode stabilizing loop would occur although the system was functioning properly. consequently, the turbulence computer 44 adjusts the threshold of the comparator level detector 40 for flight through turbulent air in the manner indicated at 52'. With the threshold 52' in effect, the elastic mode signals 50' would not cause a failure disengagement. Should a failure occur, however, disengagement of the elastic mode stabilizing loop would occur as is readily appreciated from a comparison of the failed elastic mode signal 53' with the level detector threshold 52'.

Frequency spectra 54, 55 and 56 of FIG. 2 depict properties of typical components that might be utilized in instrumenting FIG. 1. For example, the frequency spectrum 54 depicts the pass band of the filter 43 which provides frequencies representative of atmospheric turbulence disturbances to the turbulence computer 44. Frequency spectrum 55 indicates a typical rigid body control bandwidth showing the steep rolloff prior to the elastic mode frequencies. The frequency spectrum 56 depicts a typical function for the elastic body control law 24 wherein selected elastic mode frequencies are enhanced and notched as required.

Referring now to FIG. 3 in which like reference numerals indicate like components with respect to FIG. 1, a more detailed block diagram of the elastic mode monitor 30 is illustrated. As previously described, the signal from the transducer 34 is applied to the spectrum shaper 36. The spectrum shaper 36 is comprised of a high pass filter 70 which may be instrumented to have a transfer function:

$$\tau_1 S / \tau_1 S + 1 \qquad (1)$$

The output of the high pass filter 70 is applied to elastic mode shaping filters 71 which may, for example, be instrumented to have the transfer function:

$$\frac{\left(\frac{S}{\omega_2}+1\right)^2 \left(\frac{S}{\omega_3}+1\right)^2}{\left(\frac{S^2}{\omega_2^2}+\frac{2(0.1)S}{\omega_2}+1\right)\left(\frac{S^2}{\omega_3^2}+\frac{2(0.1)S}{\omega_3}+1\right)} \qquad (2)$$

The filters 71 comprise a pair of shaping functions which peak at approximately the first two critical bending mode frequencies of the aircraft. For the particular aircraft for which the filters 71 were designed, these frequencies are approximately 5 and 15 radians per second. Signals resulting from elastic modes near 50 and 60 radians, for the particular aircraft, may also be detected since the filters 71 do not include a high frequency cutoff. If any of these higher frequencies should be critical, additional peaking functions may be added. As previously described with respect to FIG. 1, the output of the filters 71 is rectified and smoothed in a 1 to 3 second time constant low pass filter 37 and the resultant signal is compared with a threshold in the level detector 40, the threshold being adjusted as a function of the RMS turbulence level.

An approximation to the RMS turbulence level is computed from the normal acceleration signal from the accelerometer 15. As previously described, the acceleration signal is transmitted through a bandpass filter 43 to eliminate maneuvering acceleration signals and to attenuate body bending and vibration signals. The bandpass filter 43 may be instrumented to have a transfer function:

$$\tau_4 S/(\tau_4 S+1)(\tau_6 S+1) \quad (3)$$

The output of the filter 43, which is designated as $e_1$ is applied to the turbulence computer 44. The signal $e_1$ is applied to conventional rectifying and squaring circuits 72 wherein the signal is rectified and shaped by an approximate squaring function. The rectifier-squarer 72 provides the signal $(e_1)^2$ as indicated by the legend. The $(e_1)^2$ signal is applied at an input to an integrator 74. The output $\epsilon$ of the integrator 74 on a lead 75 is subtractively fed back to another input to the integrator 74 with a gain of $a_1$ as indicated at 79 and also provides the input to a second integrator 76. The output of the integrator 76 $(\hat{e}_1)^2$ is applied in subtractive fashion as another input to the integrator 74 via a lead 77, the integrator 76 having a gain of $k_1$. The signal on the lead 77 is also applied to the comparator level detector 40 and is representative of the RMS level of the turbulence.

The turbulence computer 64 estimates the RMS value of the turbulence by computing the RMS value of the signal $e_1$ which is by definition $$(e_1)^2_{RMS} = \lim_{T \to \infty} \frac{1}{T} \int_0^T e_1^2 dt \quad (4)$$

This computation is effectively performed by the turbulence computer 44 by creating a new function $\epsilon$ on the lead 75 whose RMS value is zero. The function $\epsilon$ is defined as $$\epsilon = e_1^2 - \hat{e}_1^2 = 0 \quad (5)$$

where $\hat{e}_1^2$ is an estimate of the RMS value squared of $e_1$. The computation performed is $$\epsilon_{RMS} = \lim_{T \to \infty} \frac{1}{T} \int_0^T (e_1^2 - \hat{e}_1^2) dt = 0 \quad (6)$$

Since the value of this function is zero, there is no need to perform the division by T. The estimated RMS squared signal $\hat{e}_1^2$ is found by closing a first order servomechanism that attempts to force $\epsilon$ of equation (5) to zero. The equation of that servomechanism is $$d\hat{e}_1^2/dt = k_1 \epsilon \quad (7)$$

This equation (7) is solved by applying the signal $\epsilon$ on lead 75 through the integrator 76 with gain $k_1$. The output of the integrator 76 is designated $\hat{e}_1^2$ and appears on lead 77, and is subtracted from $e_1^2$ to form $\epsilon$ in integrator 74. The signal on lead 75 must also be fed back directly to the input of integrator 74 through a gain $a_1$ at 79 to ensure stability of this computation process. The signal $(\hat{e}_1^2)$ on lead 77 is the estimate of the RMS value squared of the turbulence and is applied to the comparator level detector 40.

As previously mentioned, the signal from the control surface motion transducer 34 is transmitted through the conventionally configured high pass filter 70 to the elastic mode shaping filters 71. The filters 71 are comprised of two serially connected conventional bandpass filters 80 and 81 which are designed to peak at two of the critical elastic mode frequencies of the craft.

The output of the filter 81 is applied to the conventional rectifier and filter 37, which as previously described rectifies the signal and provides signal smoothing in a 1 to 3 second time constant low pass network such that the average value of the control surface activity must exceed the threshold of the comparator-detector 40 for about 1 to 3 seconds in order for the elastic mode channel to be disabled. The output of the rectifier filter 37 is applied to the comparator level detector 40 to generate a disabling signal in a manner to be described.

As previously explained, the signal from the accelerometer 15 is transmitted through the conventional circuits of the bandpass filter 43 to the tubulence computer 44. The acceleration signal is rectified and squared in the circuits 72 and applied to the conventional operational amplifier integrating circuit 74. The output of the circuit 74 is applied as an input to the second conventional operational amplifier integrating circuit 76 whose output provides a signal on the lead 77 representative of the RMS turbulence disturbances experienced by the craft. This signal on the lead 77 is subtractively fed back to the integrator 74 to provide the negative feedback required to drive the $\epsilon$ signal on the lead 75 to zero so as to instrument the necessary computations as previously discussed.

The signal on the lead 77 from the turbulence computer 44 is applied to the comparator detector 40. As previously discussed, a signal $E_1$ representative of the spectrally shaped average value of the control surface activity is also applied to the detector 40 from the rectifier filter 37. The comparator level detector 40 may be implemented with a variety of well known circuits that generate a discrete signal or remove such a signal when a control signal exceeds a specified threshold value. For example, the comparator level detector 40 may include a conventional comparator 90. The preferred mechanization of the comparator 90 comprises an open loop operational amplifier (not shown) with a reference level $v_1$ applied to a non-inverting input thereof. If the level $v_1$ is exceeded at the inverting input thereof the output of the amplifier will change abruptly from positive to negative. The comparator 90 may also include conventional latching logic (not shown) with respect to the output of the operational amplifier. As shown, the "valid" signal is transmitted through a diode 91 poled in a direction that will block the negative transition of the comparator 90. Thus, a positive "valid" signal is provided at the output of the comparator 90 as long as the shaped $\delta_E$ signal, $E_1$, after rectification and filtering, does not exceed the reference signal $v_1$. In this case, the "valid" indicates that the elastic mode stabilization function is being accomplished properly. If $E_1$ exceeds $v_1$, then the "valid" signal disappears and a failure of the elastic mode stabilization channel is indicated and the appropriate shut down action may be initiated.

The threshold level $v_1$ is provided by a summing amplifier 92 as the sum of a nominal threshold level which corresponds to the zero turbulence level of $E_1$ that is considered acceptable plus the turbulence bias signal obtained from the estimate of the turbulence on lead 77.

It is appreciated that many other types of comparators may be implemented to accomplish this function. The important feature is that signal $v_1$ is a variable threshold for the comparator and it is varied by permitting it to increase as a function of the estimated turbulence.

It will be appreciated that the transform functions of the above-described equations (1), (2) and (3) for the components 70, 71 and 43, respectively, of FIG. 3 are designed for application in a specific aircraft. Variations and modifications of these circuits for other aircraft are within the scope of the present invention. Although the invention was described in terms of sensing the control actuator activity by means of the control surface motion transducer 34, it will be appreciated that other arrangements may be utilized in practicing the invention. For example, the signal applied to the spectrum shaper 36 may be derived from a motion sensor strategically mounted in the craft so as to sense the bending motions thereof. Since the bending motions of the craft are a function of the elastic mode control activity of the control surface actuator, a signal from a sensor so mounted would provide a proper input for the spectrum shaper 36. Although the invention is primarily suitable for detecting failures caused by malfunctions or excessive tolerance shifts in the dynamics of the gyros, computing circuits or servo-actuators for example, even changes in body bending dynamics caused by structural damage may be detected by the monitor of the present invention.

It will be furthermore appreciated that although the present invention has been described in terms of the pitch channels of an automatic flight control system, the concepts of the present invention are equally applicable to the roll and yaw channels of the system.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In an automatic flight control system for aeroelastic navigable craft having a control surface, said automatic flight control system having an elastic mode stabilizing channel for controlling said control surface in a manner normally to reduce bending motions of said craft, the combination comprising sensor means for effectively detecting the level of control activity applied to said control surface and providing a sensor signal in accordance therewith, frequency spectrum shaping means responsive to said sensor signal for transmitting only elastic mode frequencies within the normal elastic mode bandwidth of said craft to provide a filtered sensor signal representative of the level of control activity applied by said elastic mode stabilizing channel to said control surface, means for establishing a threshold greater than the normal level of said control activity, detector means responsive to said filtered sensor signal and to said threshold for providing a disabling signal in accordance with said filtered sensor signal exceeding said threshold, and disabling means responsive to said disabling signal for disabling said elastic mode stabilizing channel in accordance with said filtered sensor signal exceeding said threshold, thereby rendering said elastic mode stabilizing channel ineffective in controlling said control surface.

2. In the system of claim 1 further including turbulence sensor means responsive to the turbulence experienced by said craft for adjusting said threshold in accordance with the level of said turbulence.

3. In the system of claim 2 in which said turbulence sensor means includes turbulence computer means for computing the RMS value of said turbulence and adjusting said threshold in accordance therewith.

4. In the system of claim 1 in which said sensor means includes transducer means responsive to motion of said control surface for providing said sensor signal to said frequency spectrum shaping means, thereby providing said filtered sensor signal.

5. In the system of claim 1 in which said sensor means includes transducer means responsive to bending motions of said craft for providing said sensor signal to said frequency spectrum shaping means, thereby providing said filtered sensor signal.

6. In the system of claim 1 further including turbulence sensor means for detecting the level of turbulence experienced by said craft and providing a turbulence signal in accordance therewith, and said means for establishing a threshold further including adjusting means responsive to said turbulence signal for adjusting said threshold in accordance therewith.

7. In the system of claim 6 in which said adjusting means comprises means for increasing and decreasing said threshold in accordance with increases and decreases, respectively, in said level of turbulence.

8. In the system of claim 6 in which said turbulence sensor means comprises accelerometer means for sensing the normal acceleration of said craft and providing a normal acceleration signal in accordance therewith, and turbulence computer means coupled to said accelerometer means for computing the root-mean-square value of said normal acceleration signal thereby providing said turbulence signal.

9. In the system of claim 8 in which said turbulence sensor means further includes bandpass filter means coupling said accelerometer means to said turbulence computer means for selectively enhancing turbulence frequencies and rejecting maneuvering signal frequencies and bending mode frequencies.

10. In the system of claim 8 in which said turbulence computer means comprises squaring means responsive to said normal acceleration signal for generating the square thereof, first integrator means coupled to receive said squared normal acceleration signal for providing the integral thereof, second integrator means responsive to said integral from said first integrator means for providing the integral thereof, said integral from said second integrator means being applied in substractive fashion as an input to said first integrator means, said integral from said second integrator means thereby providing said turbulence signal.

11. In the system of claim 1 in which said automatic flight control system further includes a plurality of channels for stabilizing the rigid body modes of said craft, said disabling means comprising means for disabling only said elastic mode channel in accordance with said control activity exceeding said threshold while maintaining said rigid body mode channels active.

* * * * *